US012000376B2

(12) United States Patent
Ventura Garcia et al.

(10) Patent No.: US 12,000,376 B2
(45) Date of Patent: Jun. 4, 2024

(54) WIND TURBINE TOWER SECTION, WIND TURBINE TOWER, AND METHOD FOR ASSEMBLY

(71) Applicant: ArcelorMittal, Luxembourg (LU)

(72) Inventors: Beatriz Ventura Garcia, Liège (BE); Michaël Gremling, Seraing (BE); Emilie Dupont, Spa (BE)

(73) Assignee: ArcelorMittal, Luxembourg (LU)

( * ) Notice: Subject to any disclaimer, the term of this patent is extended or adjusted under 35 U.S.C. 154(b) by 167 days.

(21) Appl. No.: 17/286,735

(22) PCT Filed: Oct. 30, 2018

(86) PCT No.: PCT/IB2018/058467
§ 371 (c)(1),
(2) Date: Apr. 19, 2021

(87) PCT Pub. No.: WO2020/089673
PCT Pub. Date: May 7, 2020

(65) Prior Publication Data
US 2021/0381492 A1    Dec. 9, 2021

(51) Int. Cl.
*F03D 13/20*    (2016.01)

(52) U.S. Cl.
CPC .......... *F03D 13/20* (2016.05); *F05B 2230/60* (2013.01); *F05B 2240/912* (2013.01); *F05B 2250/131* (2013.01); *F05B 2260/301* (2013.01)

(58) Field of Classification Search
CPC ................ F03D 13/20; F05B 2250/131; F05B 2230/60; F05B 2240/912; F05B 2260/301
See application file for complete search history.

(56) References Cited

U.S. PATENT DOCUMENTS

| 10,041,269 | B2 * | 8/2018 | Gremling | E04H 12/08 |
| 11,499,528 | B2 * | 11/2022 | Ventura Garcia | F03D 13/20 |
| 2009/0090069 | A1 | 4/2009 | Willis et al. | |
| 2010/0313497 | A1 * | 12/2010 | Jensen | E04H 12/08 |
| | | | | 52/651.07 |

(Continued)

FOREIGN PATENT DOCUMENTS

| CA | 3018672 A1 | 10/2015 |
| CN | 101970776 A | 2/2011 |

(Continued)

OTHER PUBLICATIONS

See Search Report of PCT/IB2018/058467 dated Jul. 12, 2019.

*Primary Examiner* — Andrew J Triggs
(74) *Attorney, Agent, or Firm* — Davidson Kappel LLC

(57) ABSTRACT

A tower section (1) for wind turbine including a wall including an inner surface (12) and an outer surface (13), the tower section including at least two tubular tower elements (14) stacked and connected together by element connectors (36) each extending astride the two tower elements, each tower element including at least two wall segments (16), connected together by segment connectors (26), the element connectors being arranged on only one of the wall surfaces and the segment connectors being arranged only on the other wall surface and no element connector facing at least partially a segment connector in a radial direction such that the wall is at no point interposed between this element connector and a segment connector.

17 Claims, 5 Drawing Sheets

(56) References Cited

U.S. PATENT DOCUMENTS

| | | |
|---|---|---|
| 2010/0319276 A1 | 12/2010 | Kryger et al. |
| 2011/0283652 A1 | 11/2011 | Haridasu et al. |
| 2013/0000241 A1 | 3/2013 | Jensen et al. |
| 2017/0030102 A1 | 2/2017 | Pedersen |
| 2017/0248126 A1 | 8/2017 | Pedersen |
| 2018/0003158 A1 | 4/2018 | Pedersen et al. |
| 2021/0381492 A1* | 12/2021 | Ventura Garcia ....... E04H 12/08 |
| 2022/0010778 A1* | 1/2022 | Ventura Garcia ....... F03D 13/20 |

FOREIGN PATENT DOCUMENTS

| | | |
|---|---|---|
| CN | 102939460 A | 2/2013 |
| CN | 205669338 U | 11/2016 |
| CN | 107076122 A | 8/2017 |
| EP | 2006471 A1 | 12/2008 |
| WO | WO2016116107 | 7/2016 |

\* cited by examiner

WIND TURBINE TOWER SECTION, WIND TURBINE TOWER, AND METHOD FOR ASSEMBLY

This invention relates to a tower section for wind turbine, a wind turbine tower comprising such a section, as well as a method for assembling a tower section for wind turbine.

BACKGROUND

Efforts to improve the energy efficiency of wind turbines have resulted over time in increasing turbine size, which requires towers of increased height and diameter for their support. Due to their large dimensions, such towers cannot be transported in the assembled state. As a result, the towers are generally transported in segments to the wind turbine installation site before being assembled in situ.

In particular, there are methods for assembling wind turbine towers, whereby wind turbine wall segments are transported to the wind turbine installation site, then these wall segments are assembled using connector segments to form substantially tubular, generally cylindrical or frusto-conical tower elements, which are then successively assembled together using element connectors to form the wind turbine tower.

In view of the increasing size of wind turbine towers, it is necessary to improve the tensile strength of these towers so as to minimize the risk of failure, in particular by buckling, during use, while limiting manufacturing costs and assembly time as much as possible.

SUMMARY OF THE INVENTION

One object of the invention is to provide a wind turbine tower, which may possibly have a great height, having an increased service life and which can be transported easily and quickly and is capable of being assembled inexpensively.

The invention relates to a tower section for wind turbine having a central longitudinal axis extending in a longitudinal direction and comprising a wall comprising an inner surface and an outer surface, the tower section comprising at least two tubular tower elements stacked in the longitudinal direction, arranged edge to edge at a joining plane and connected together by element connectors each extending astride said two tower elements, each tower element comprising at least two wall segments, connected together by segment connectors extending along the longitudinal edges of the wall segments, the element connectors being arranged on only one of either the inner and outer surfaces of the wall of the tower section, and the segment connectors being arranged only on the other of the inner surface or outer surface of the wall of the tower section and no element connector facing at least partially a segment connector in a radial direction of the tower section so that the wall is at no point interposed between this element connector and a segment connector.

According to particular embodiments, the tower section has one or more of the following properties, taken separately or in any technically possible combination:
- the element connectors are arranged on the outer surface of the tower section and the segment connectors are arranged on the inner surface of the tower section,
- each element connector extends between at least two segment connectors aligned in the longitudinal direction, one of these two segment connectors, said upper segment connector, being arranged above the joining plane between the two tower elements and the other of these two segment connectors, said lower segment connector, being arranged below this joining plane,
- the distance between the upper transverse edge of the element connector and the lower transverse edge of the upper segment connector is greater than or equal to zero and the distance between the lower transverse edge of the element connector and the upper transverse edge of the lower segment connector is greater than or equal to zero,
- the upper transverse edge of the element connector and the lower transverse edge of the upper segment connector are located in the same plane perpendicular to the longitudinal direction and wherein the lower transverse edge of the element connector and the upper transverse edge of the lower segment connector are located in the same plane perpendicular to the longitudinal direction,
- each segment connector and/or element connector is in the form of a flat plate,
- each wall segment comprises at least one central panel and two side panels forming an angle with the central panel or each central panel, the side panels comprising the longitudinal edges of the wall segment,
- the tower section also comprises intermediate connectors, extending astride two adjacent tower elements, between two circumferentially adjacent connector elements, said intermediate connectors being arranged on the same surface among the inner surface and the outer surface of the tower section as the element connectors,
- each intermediate connector extends astride two longitudinally adjacent central panels of the two tower elements and each segment connector extends astride two circumferentially adjacent side panels of at least one of the two adjacent tower elements,
- the longitudinal edges of a wall segment of the upper tower element are located in the extension of the longitudinal edges of the adjacent wall segment in the longitudinal direction of the lower tower element,
- the adjacent tower elements are angularly offset from each other,
- the tower section has a tubular shape with a polygonal cross-section, each side of this polygon defining a facet of the tower section.

The invention also relates to a wind turbine tower comprising a tower section as described above.

The invention also relates to a method for assembling a tower section as described above, comprising:
- the provision of wall segments and the assembly of these wall segments together by means of segment connectors to form tower elements;
- the stacking, in the longitudinal direction, of two tower elements and the connection together of these two tower elements by means of element connectors.

BRIEF DESCRIPTION OF THE DRAWINGS

The invention will be better understood upon reading the description that follows, given only by way of example, and made with reference to the attached drawings, in which.

DETAILED DESCRIPTION

Throughout the description, "connection" means the mechanical attachment by a connecting member, and, in particular attachment by bolting or by screwing. This term does not thus include, in particular, attachment by welding or by brazing.

The use of bolts or of screws to perform the connections makes it possible to best manage the fatigue behavior of the tower section by selecting the locations and density of the bolts or of the screws as a function of the requirements for fatigue strength and fatigue endurance. In addition, the absence of welds within the tower section and the wind turbine tower means that heat-affected areas are absent, which guarantees homogeneity of steel performance and avoids the weak points generated by these heat-affected areas.

"Height" means the dimension of an element in the longitudinal direction and "width" means the dimension of the element perpendicular to the longitudinal direction.

Throughout the description, "longitudinal edges" of an element means the edges of this element extend in the longitudinal direction. "Transverse edges" means the edges of this element extend perpendicular to the longitudinal direction.

The terms "high" and "low", "below" and "above", and "lower" and "upper" are used with respect to the normal orientation of the wind turbine tower 2 at its installation site.

Throughout the description, "angular offset" means the rotation of a component of the tower along the central longitudinal axis L relative to an adjacent element.

Throughout the description, the components of the tower, of the tower section, and of the tower elements are preferably made of metal, in particular steel, and especially from steel coils or steel plates.

The tower section 1 for wind turbine according to the invention is intended to form a part of a tower 2 of a wind turbine 3.

Figure 1:
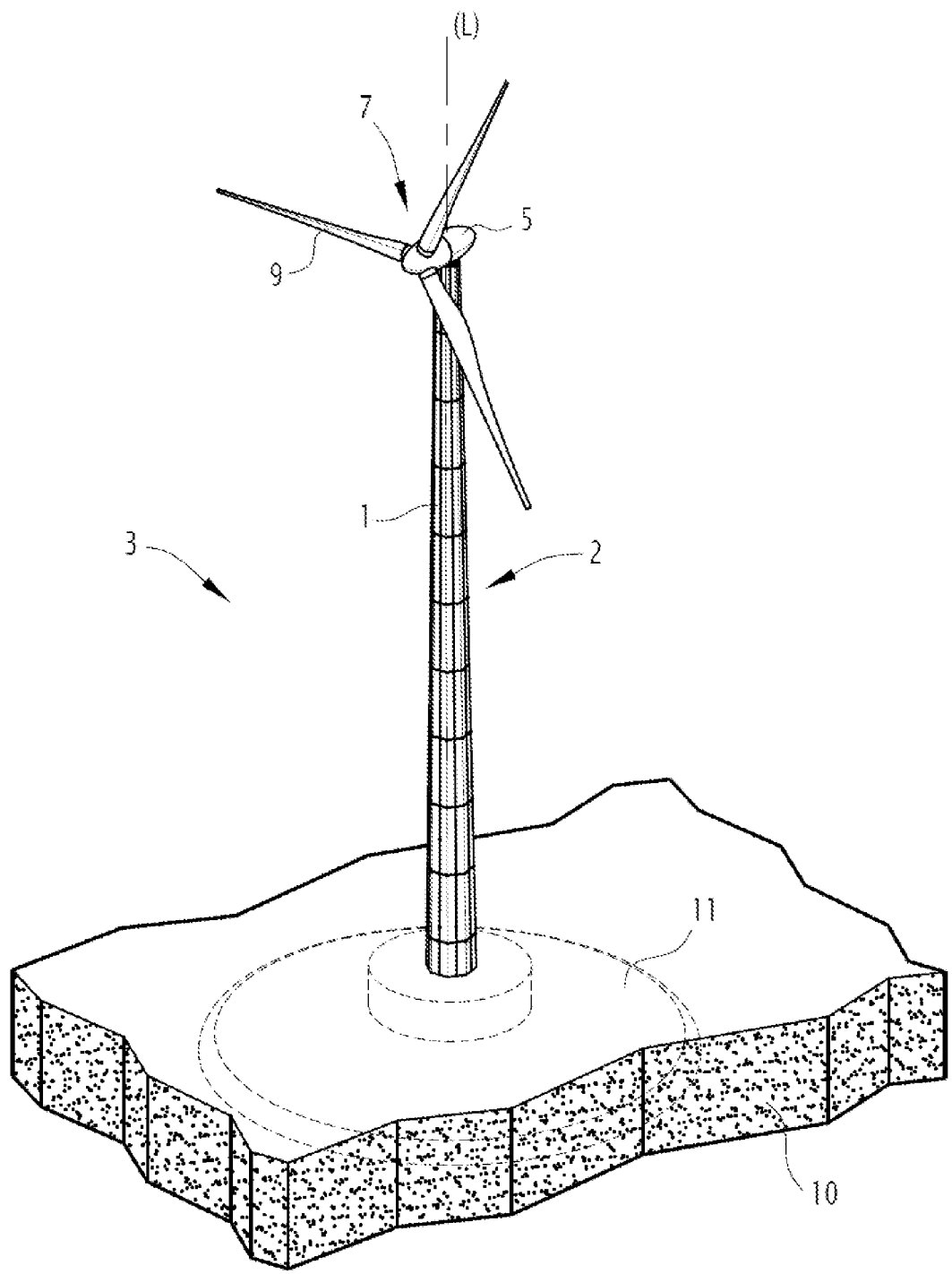
FIG. 1 is a schematic perspective view of a wind turbine.

Conventionally, and as shown in FIG. 1, the wind turbine 3 has, at its upper end, a nacelle 5 and a rotor 7 mounted on the nacelle 5. The nacelle 5, mounted at the upper end of the tower 2, houses mechanical, electrical and electronic components for the operation of the wind turbine 3. The rotor 7 comprises a plurality of blades 9 intended to be driven in rotation about an axis of the rotor 7 by wind energy. At its lower end, the wind turbine tower 2 is intended to be anchored in the ground 10 of the installation site, by any means known to those skilled in the art, in particular by suitable foundations 11.

The tower section 1 according to the invention has a tubular shape with a central axis L extending in a longitudinal direction. When the tower section 1 is installed on the wind turbine installation site, the longitudinal direction extends along the vertical of the installation site.

In the examples shown in the figures, the tower section 1 has a frustoconical shape, narrowing upward on tower 2.

A "cone" means any regular surface defined by a generator passing through an apex and a variable point describing a reference curve.

By way of example, the tower section 1 has an external diameter in the range of 7 to 11 meters, and, for example, equal to 9 meters at its lower end, and in the range of 2 to 4 meters, and, for example, equal to 4 meters at its upper end. However, these diameters can be modified as a function of the requirements for strength, for connection to the nacelle, or those associated with the installation site.

Figure 2:
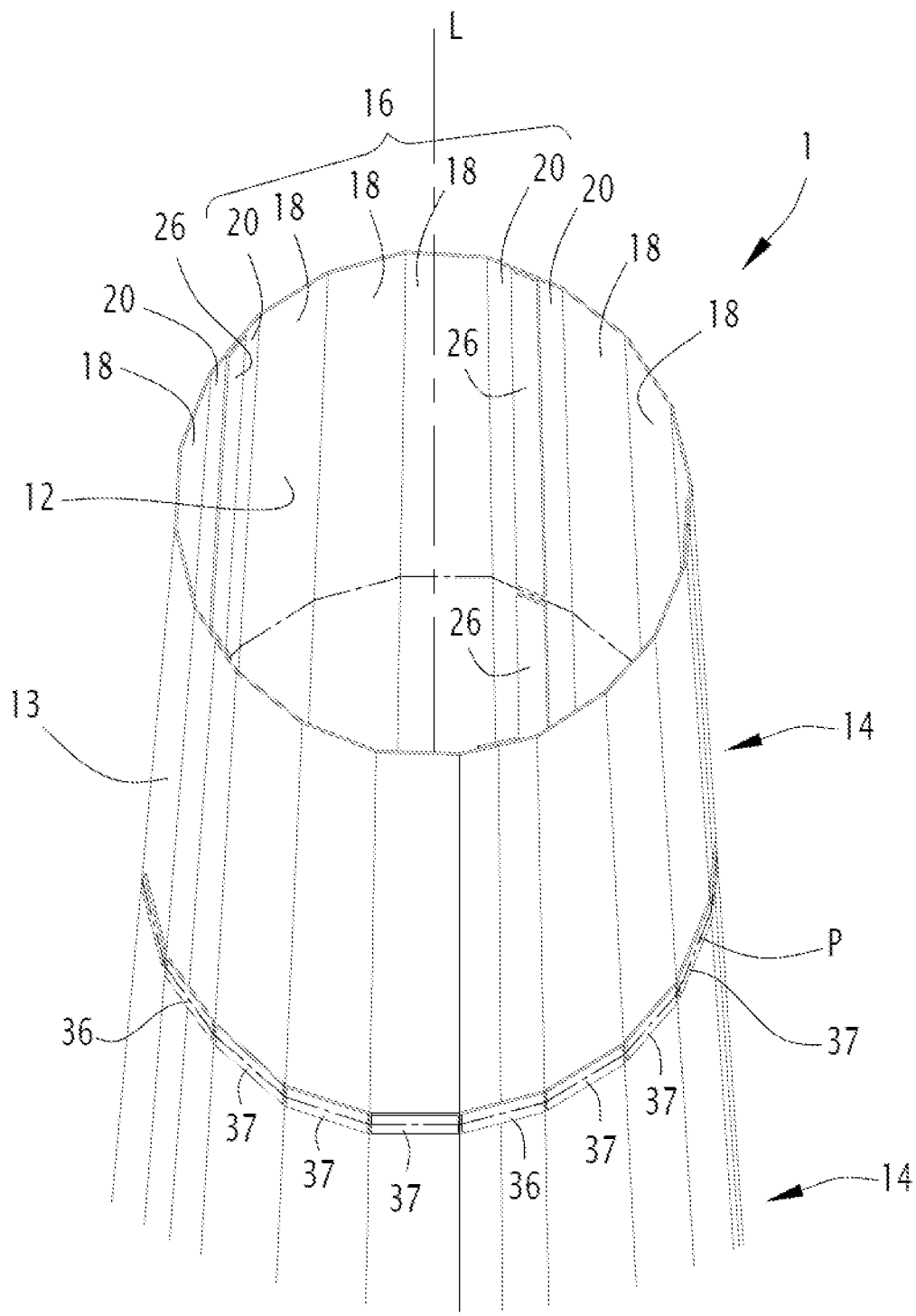
FIG. 2 is a schematic perspective view of part of a wind turbine tower section.

The tower section 1 comprises a wall with an inner surface 12 and an outer surface 13, as shown in FIG. 2. The inner surface 12 of the tower section 1 is oriented toward the inside of the tower section 1. The outer surface 13 of the tower section 1 is oriented toward the outside of the tower section 1.

The tower section 1 preferably has a polygonal cross-section. Each side of this polygon defines a facet of the wall of the tower section 1.

A polygonal frustoconical shape has the advantage of being as close as possible to a frustoconical shape with a circular base, which is the shape having the best wind resistance regardless of its orientation and the best inertia, while being quite simple to manufacture, as it can be made in particular from wall segments obtained by simple bending or shaping of metal sheets.

According to a variant, the tower section 1 has a cylindrical shape with a polygonal base and a constant cross-section.

As shown in FIG. 2, the tower section 1 comprises at least two tower elements 14, stacked in the longitudinal direction. The adjacent tower elements 14 of the tower section 1 are arranged edge to edge along a joining plane P, with the necessary clearances for assembly.

Each tower element 14 has a tubular shape, with a central longitudinal axis coinciding with the central longitudinal axis L of the tower section 1. Its general shape is similar to that of the tower section 1.

In the examples shown, the tower element 14 has a frustoconical shape, preferably with a polygonal base, narrowing upward on the tower element 14.

When the tower section 1 has a cylindrical shape with a polygonal base, the tower element 14 also has a cylindrical shape with a polygonal base.

Each tower element 14 comprises a plurality of wall segments 16 connected together by their longitudinal edges. The adjacent wall segments 16 of a tower element 14 are arranged edge to edge along a junction line, with the necessary clearances for assembly.

The fact that the tower elements 14 are made up of a plurality of interconnected wall segments 16 avoids limitations to transport in terms of the final diameter of the tower element 14. Indeed, wall segments 16 are relatively space-saving and can therefore be transported by standard trucks. They can then be assembled directly at the wind turbine installation site to obtain tower elements 14 having the desired diameter.

In addition, the design based on the assembly of small components makes it possible to use compact and light vehicles for transport, which makes it possible to consider new locations that were previously not considered because they were only accessible with difficulty by heavy transports such as so-called exceptional transport.

By way of example, the thickness of wall segments 16 varies according to their position along tower 2, decreasing from the base to the apex of tower 2. For example, wall segments 16 have a thickness of 30 mm at the base of tower 2 and 16 mm at the apex of tower 2.

Figure 3:
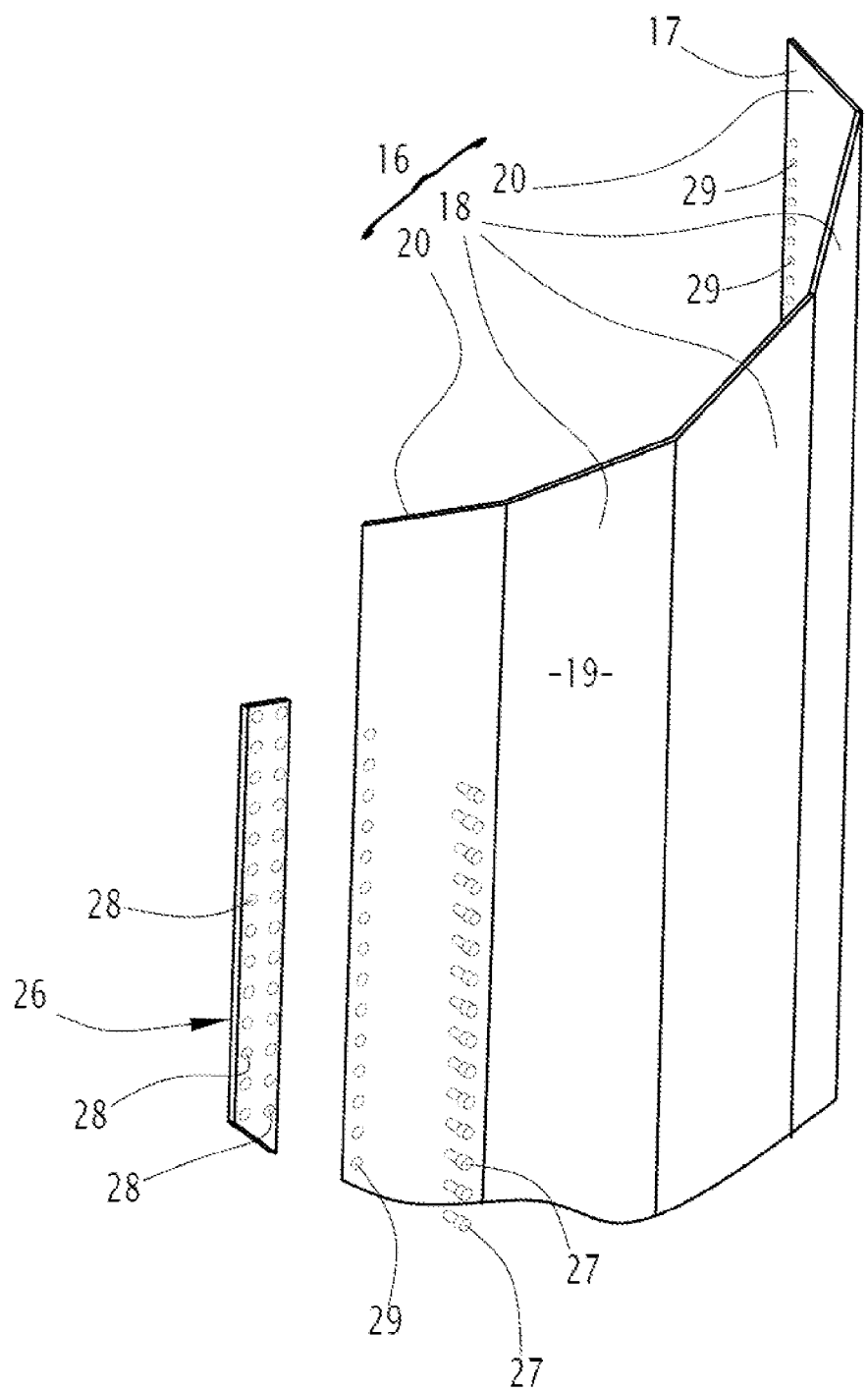
FIG. 3 is an exploded schematic perspective view of part of the tower section in FIG. 2.

As shown in FIG. 3, each wall segment 16 comprises an inner side 17, facing inside the tower section 1, and an outer side 19 facing outside the tower section 1. The inner surface 12 of the tower section 1 is formed by the joining of inner sides 17 of each of the wall segments 16 of the tower section 1. The outer surface 13 of the tower section 1 is formed by the joining of the outer sides 18 of each of the wall segments 16 of the tower section 1.

In the example shown in FIGS. 2 and 3, each wall segment 16 comprises at least one central panel 18 and two side panels 20. The side panels 20 extend on both sides of the central panel 18 over the circumference of the tower element 14. They laterally enclose the central panel 18. The side panels 20 comprise the longitudinal edges of the wall segment 16. They each form an angle with the central panel or panels 18.

This type of wall segment 16 has the advantage of being easily obtained by simple folding of a metal sheet. The side panels 20 stiffen the wall segments 16 and increase the bending strength of said segments 16 in the longitudinal direction.

In the example shown, for the tower element 14 shown, each wall segment 16 comprises several adjacent central panels 18, over the circumference of the tower element 14. This set of adjacent central panels 18 is enclosed by the two side panels 20. More specifically, in this example, for the tower element 14 shown, each wall segment 16 comprises three central panels 18 and two side panels 20.

According to one embodiment, the wall segments 16 of a given tower element 14 have a number of central panels 18 as a function of the position of the tower element in the longitudinal direction. By way of example, the number of central panels 18 per wall segment 16 increases from base to apex along the tower section 1.

The joining of adjacent side panels 20 of two adjacent wall segments 16 of a tower element 14 forms a facet of the tower element 14. Each central panel 18 of a wall segment 16 also forms a facet of the tower element 14.

Each facet of the associated tower section 1 thus corresponds to the joining of longitudinally adjacent facets of stacked tower elements 14.

The wall segments 16 are joined together by segment connectors 26 extending along the longitudinal edges of the wall segments 16.

The segment connectors 26 are attached to the wall segments 16.

Each segment connector 26 extends astride two circumferentially adjacent wall segments 16 of a tower element 14. It is attached to the adjacent side panels 20 of the two adjacent wall segments 16 of the tower element 14.

The segment connectors 26 are shown more particularly in FIGS. 2, 3, 5, and 6.

In the example shown in FIGS. 1 to 6, the segment connectors 26 are arranged on the inner surface 12 of the tower section 1. In this example, each segment connector 26 is supported on the inner surface 12 of the tower section 1, and more particularly on the inner sides 17 of the two wall segments 16 connected together by the segment connector 26.

As shown schematically in FIG. 3, each segment connector 26 is attached to the corresponding wall segments 16 by means of primary connection members 27, in particular screws or bolts. To this end, the segment connectors 26 comprise connection ports 28 for receiving the primary connection members 27. These connection ports 28 are organized in the form of a network including lines, extending perpendicular to the longitudinal direction and rows, extending parallel to the longitudinal direction.

The wall segments 16 also comprise connection ports 29 organized in a network that coincides with the network of connection ports 28 of the segment connectors 26.

For the purpose of simplifying the drawings, the primary connecting elements 27 and the connection ports 28, 29 are shown only in some of the figures.

Preferably, the segment connectors 26 are flat. They are advantageously made by simple cutting from a steel sheet.

In the embodiment shown in FIGS. 1 to 6, the width of the segment connectors 26 is constant over their entire height. Each segment connector 26 has, in this example, a rectangular shape that is elongated in the longitudinal direction.

In this embodiment, the width of the segment connectors 26 is less than or equal to 40% of the width of the facet of the tower element 14 formed by the connection of the side panels 20 of two wall segments 16 of the tower element 14 by means of said segment connector 26. More particularly, it is less than or equal to 30% of this width. This width can be modified for each segment connector 26 of the tower section 1 according to the forces that the segment connector 26 must withstand.

Preferably, for reasons of economics and on-site logistics, all segment connectors 26 of the tower section 1 have the same dimensions.

According to one embodiment, each tower element 14 comprises a single segment connector 26 at each junction between two circumferentially adjacent wall segments 16.

According to a variant, the tower element 14 comprises, at each junction between two adjacent wall segments 16, at least two segment connectors 26 adjacent in the longitudinal direction.

The selection of the number of segment connectors 26 per tower element 14 depends on the height of said tower elements 14, the number of segment connectors 26 per tower element 14 increasing in particular as the height of the tower element 14 increases.

The tower section 1 also comprises means for connecting together two adjacent tower elements 14 in the longitudinal direction.

These connection means comprise element connectors 36, each extending astride two adjacent tower elements 14 in the longitudinal direction.

Each element connector 36 extends in the extension, in the longitudinal direction, of at least one segment connector 26.

Figure 5:
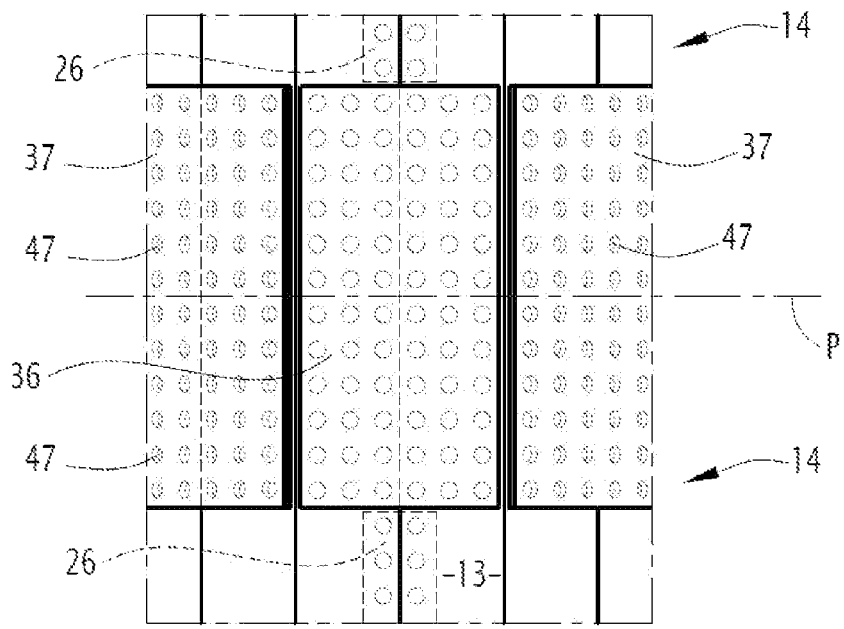
FIG. 5 is an enlarged schematic view of a junction area between two tower elements of a tower section in FIG. 2, as seen from outside the tower, showing an element connector and, with dotted lines, segment connectors arranged inside the tower section.
Figure 6:
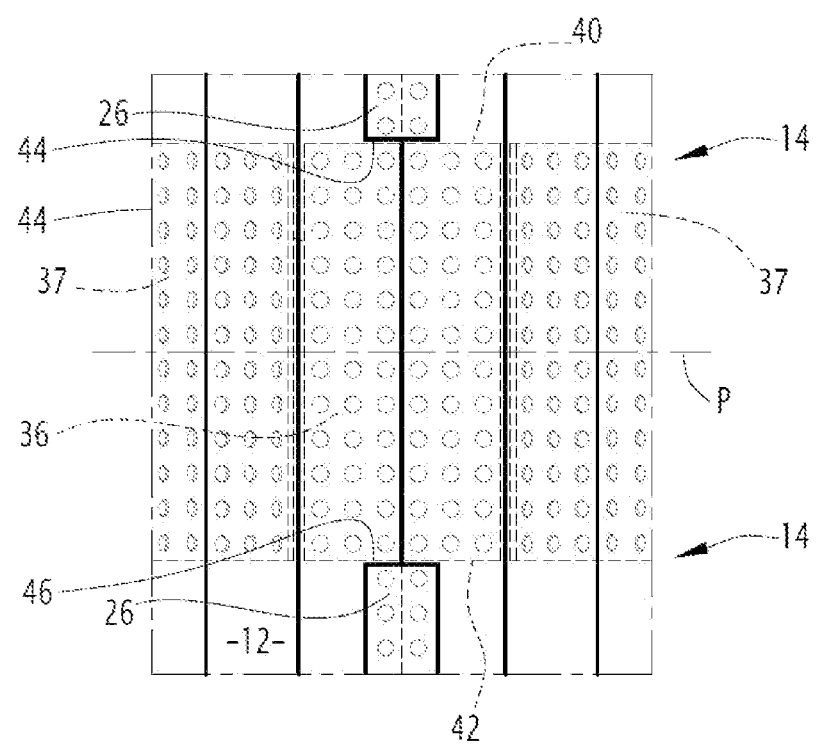
FIG. 6 is a view similar to that of FIG. 5, as seen from inside the tower, showing segment connectors arranged inside the tower and, with dotted lines, an element connector arranged outside the tower section.

According to the invention, and as shown in particular in FIGS. 2, 5, and 6, the element connectors 36 are arranged on a surface of the tower section 1 opposite to the segment connectors 26. In the example shown in the Figures, the segment connectors 26 are arranged on the inner surface 12 of the tower section 1, whereas the element connectors 36 are arranged on the outer surface 13 of the tower section 1. Each element connector 36 is supported on the outer surface 13 of the tower section 1. In other words, the tower section does not comprise any connectors extending astride the two tower elements 14 and arranged on the inner surface 12 of the tower section 1.

Preferably, the element connectors 36 are flat. They are advantageously made by simple cutting from a steel sheet.

In the embodiment shown, the width of element connectors 36, measured perpendicular to the longitudinal direction, is constant over the entire height of element connectors 36, measured in the longitudinal direction.

Each element connector 36 has, in the examples shown, a rectangular shape elongated in a direction perpendicular to the longitudinal direction.

In the case of a tower section 1 having facets, each element connector 36 extends over a facet of the tower section 1, astride the adjacent facets longitudinally of the tower elements 14 connected together by this element connector 36.

The element connectors 36 have a width less than or equal to the width of the facet of the tower section 1 to which they are attached, measured at the joining plane P between these two tower elements 14. Advantageously, the element connectors 36 have a width greater than or equal to 70% of the width of this facet, and more particularly greater than or equal to 85% of this width. In the embodiment shown in the figures, the element connectors 36 have a width substantially equal to the width of the facet of the tower section 1 to which they are attached.

In the example shown in the Figures, element connector 36 extends in the transverse direction beyond the adjacent segment connector 26.

In the example shown in the Figures, the element connectors 36 are symmetrical with respect to the joining plane P between the tower elements 14 they overlap.

The element connectors 36 are attached to the tower elements 14 by means of secondary connection members, made up, for example, by screws or bolts.

Figure 4:
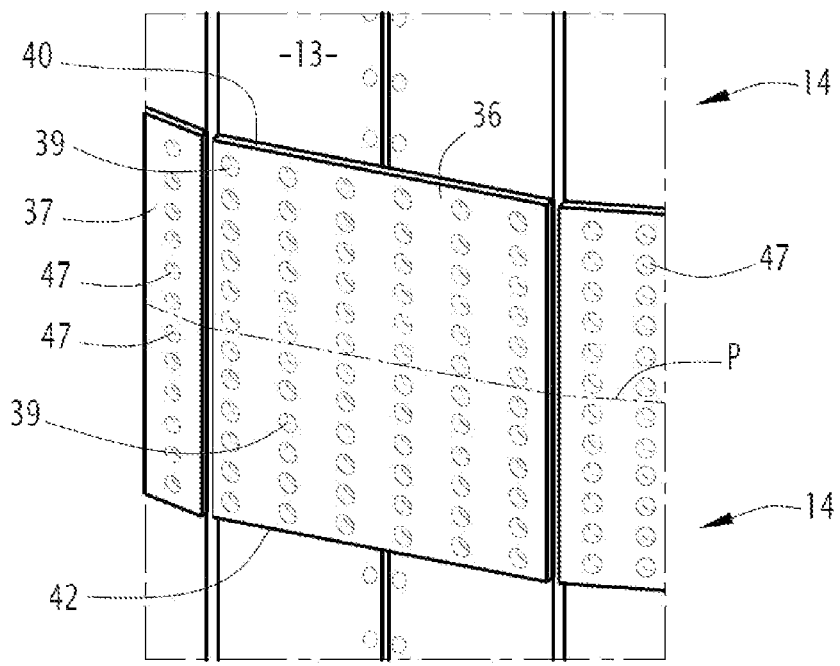
FIG. 4 is an enlarged schematic view of a junction area between two tower elements of the tower section in FIG. 2, as seen from outside the tower.

By way of example, and as shown in FIG. 4, each element connector 36 comprises a regular network of connection ports 39 for receiving the secondary connection members, this network including lines extending perpendicular to the longitudinal direction and rows extending parallel to the longitudinal direction. This network is, for example, a rectangular mesh network, and, for example, a square mesh network. The connection ports 39 are evenly distributed over the entire surface of element connectors 36.

The distance between adjacent connection ports 39 is selected to optimize tensile strength and fatigue strength as a function of the needs and geometric criteria established by applicable standards.

The tower segments 16 comprise a network of connection ports coinciding with the network of connection ports 39 of element connectors 36.

Within segment connectors 26 and/or element connectors 36, the distances between the lines of connection ports 28, 39, formed perpendicular to the longitudinal direction and/or between the rows of connection ports 28, 39, formed parallel to the longitudinal direction, are selected so as to optimize the number of bolts required according to the mechanical stresses.

By way of example, the distance between the connection port lines 28 of the segment connectors 26 is different from the distance between the connection port lines 39 of element connectors 36.

In the embodiment shown in FIGS. 1 to 6, the distances between the rows of connection ports 28, formed parallel to the longitudinal direction, of segment connectors 26 and between the rows of connection ports 39, formed parallel to the longitudinal direction, of element connectors 36 are identical so that within the tower section 1, the rows of connection ports 28 extend in the extension, in the longitudinal direction, of rows of connection ports 39.

For the purpose of simplifying the drawings, the secondary connection members and connection ports are shown only on some of the figures.

In the embodiment shown in FIGS. 1 to 6, the longitudinal edges of a wall segment 16 of the upper tower element 14 are located in the extension of the longitudinal edges of the adjacent wall segment 16 in the longitudinal direction of the lower tower element 14. Thus, the side panels 20 of upper tower element 14 are arranged in the extension, in the longitudinal direction, of the side panels 20 of lower tower element 14 and the central panels 18 of the upper tower element 14 are arranged in the extension, in the longitudinal direction, of the central panels 18 of the lower tower element 14. In this example, each element connector 36 extends astride the side panels 20 of four adjacent wall segments 16.

According to the invention, and as illustrated more particularly in FIGS. 5 and 6, no element connector 36 faces a segment connector 26 in a radial direction of tower section 1 so that the wall is at no point interposed between this element connector 36 and a segment connector 26.

"Radial direction" means a direction passing through the longitudinal central axis L of the tower section 1 and extending in a plane normal to that longitudinal central axis L.

There is thus no area of overlap between the element connector 36 and the segment connector 26.

Therefore, at each junction between two tower elements 14, there is no superposition, in the radial direction, of the element connector 36, of the wall of the tower element 14, and of the segment connector 26 resulting in a triple wall thickness.

In particular, the distance between the upper transverse edge of the element connector 36 and the lower transverse edge of the segment connector 26 arranged above the joining plane P is greater than or equal to zero. In the example shown in FIGS. 1 to 6, this distance is zero; in other words, the upper transverse edge of the element connector 36 and the lower transverse edge of the segment connector 26 arranged above the joining plane P are in the same horizontal plane.

Similarly, the distance between the lower transverse edge of the element connector 36 and the upper transverse edge of the segment connector 26 arranged below the joining plane P is greater than or equal to zero. In the example shown in FIGS. 1 to 6, this distance is zero; in other words, the lower transverse edge of the element connector 36 and the upper transverse edge of the segment connector 26 arranged below the joining plane P are in the same horizontal plane.

In the example shown in FIGS. 1 to 6, each element connector 36 extends between two segment connectors 26 aligned in the longitudinal direction.

One of these two segment connectors 26, hereinafter called upper segment connector 26, connects together wall segments 16 of the upper tower element 14 among the two tower elements 14 connected together by the element connector 36, whereas the other segment connector 26, hereinafter called lower segment connector 26, connects together wall segments 16 of the lower tower element 14 among the two tower elements 14 connected together by the element connector 36.

The upper segment connector 26 is arranged above the joining plane P between the tower elements 14 connected together by the element connector 36, whereas the lower segment connector 26 is arranged below the joining plane P.

Advantageously, the upper segment connector 26 and the lower segment connector 26 are symmetrical with respect to the joining plane P between the two tower elements 14 connected by the element connector 36.

Therefore, the distance between the lower edge 42 of the element connector 36 and the upper edge 46 of the connector of lower segment 26 is identical to the distance between the upper edge 40 of the element connector 36 and the lower edge 44 of the upper segment connector 26.

Optionally, the means for connecting together the tower elements 14 also comprise intermediate connectors 37, shown in particular in FIG. 2 and FIG. 4.

The intermediate connectors 37 connect the tower elements 14 together at central panels 18 of their wall segments 16. They extend astride the two adjacent tower elements 14 by being attached to the central panels 18 of the wall segments 16 of these tower elements 14. They are arranged between two circumferentially adjacent element connectors 36. They extend along the transverse edges of the tower elements 14.

The intermediate connectors 37 are preferably arranged on the same surface of the tower section 1 as the element connectors 36. Thus, in the example shown in FIGS. 1 to 6, the intermediate connectors 37 are arranged on the outer surface 13 of the tower section 1. They are supported on the outer surface 13 of the tower section 1, and more particularly on the outer side 19 of the adjacent tower segments 16 in the longitudinal direction connected together by the intermediate connector 37.

Preferably, the intermediate connectors 37 are substantially flat. In the example shown, they have a rectangular shape. They extend in a direction of elongation perpendicular to the longitudinal direction.

The intermediate connectors 37 have a width less than or equal to the width of the facet of the tower section 1 to which they are attached, measured at the joining plane P between these tower elements 14. This facet is formed by the joining of central panels 20 of the two longitudinally adjacent wall segments 16. By way of example, the intermediate connectors 37 have a width greater than or equal to 50% of the width of this facet, measured at the joining plane P between these tower elements 14, and in particular a width substantially equal to the width of this facet.

The intermediate connectors 37 contribute to maintaining rigidity along the tower 2, and more particularly between two adjacent tower elements 14.

The intermediate connectors 37 are attached to the wall segments 16 by means of tertiary connection elements, such as screws or bolts. Each intermediate connector 37 comprises a regular network of connection ports 47 intended to receive the tertiary connection members. This network is for example a rectangular mesh network, and for example a square mesh network. The connection ports 47 are evenly distributed over the entire surface of intermediate connectors 37. The distance between adjacent connection ports 47 is selected to optimize tensile strength and fatigue life as a function of requirements.

When the tower section 1 comprises intermediate connectors 37, the wall segments 16 comprise a network of connection ports coinciding with the network of connection ports of the intermediate connectors 37.

For the purpose of simplifying the drawings, the tertiary connection elements have not been shown in the figures.

The invention also has as its object a method for assembling a tower section 1 as described above.

This assembly method comprises:
The provision of wall segments 16 and the assembly of these wall segments 16 together by means of segment connectors 26 so as to form tower elements 14; and
The stacking, in the longitudinal direction, of two tower elements 14 and the connection together of these two tower elements 14 by means of element connectors 36.

According to the invention, the element connectors 36 are arranged on a surface of the tower section 1 opposite to the surface on which the segment connectors 26 are arranged. Thus, the element connectors 36 and the segment connectors 26 are arranged on either side of the wall segments 16, in the radial direction.

Preferably, the segment connectors 26 and/or element connectors 36 are pre-assembled on wall segments 16 prior to the assembly of the wall segments 16 together to form the tower elements 14. They are pre-assembled, in particular, on the wall segments 16 at the manufacturing site for the wall segments 16, prior to the transport of the wall segments 16 to the assembly site of the tower section 1.

More particularly, the segment connectors 26 are pre-assembled on one side of the wall segment 16 and the element connectors 36 are pre-assembled on the opposite side of the wall segment 16. By way of example, the segment connectors 26 are pre-assembled on the inner side 17 of wall segment 16 and the element connectors 36 are pre-assembled on the outer side 18 of wall segment 16.

Optionally, during the stacking step, the two tower elements 14 are also connected by means of intermediate connectors 37, these intermediate connectors 37 preferably extending astride two central panels 18 longitudinally adjacent to the wall segments 16 of the two tower elements 14.

Preferably, the intermediate connectors 37 are pre-assembled on wall segments 16 prior to the assembly of wall segments 16 together to form the tower elements 14. They are in particular, pre-assembled on the wall segments 16 at the manufacturing site for the wall segments 16, prior to the transport of the wall segments 16 to the assembly site of the tower section 1. By way of example, the intermediate connectors 37 are pre-assembled on the same side of the wall segment 16 as the element connectors 36.

By way of example, each wall segment 16 comprises at least one segment connector 26 pre-assembled on one of its longitudinal edges and/or at least one element connector 36, pre-assembled on one of either the lower edge or the upper edge of the wall segment 16, and preferably to its upper edge. Optionally, each wall segment 16 also comprises at least one intermediate connector 37, pre-assembled on the same edge of the wall segment 16 as the element connector 36.

In the case where the element connectors are pre-assembled on the wall segments 16, as described above, the assembly of the tower elements together can be carried out from inside the tower section 1, which is advantageous from a safety perspective.

The invention also relates to a wind turbine tower 2 comprising at least one tower section 1 as described above. Advantageously, the wind turbine tower 2 is formed by stacking, in the longitudinal direction, of such tower sections 1.

The tower section 1 according to the invention is advantageous. Indeed, this tower section 1 has a very good bending strength as a result of the distribution of segment connectors 26 and element connectors 36 on both sides of the tower section, in particular at the junction between tower elements 14. In particular, alternating the connectors between the two sides of the tower section contributes to reducing the stresses related to the effects of eccentricities that are manifested through additional and localized contributions from the bending moment, particularly in the region between the segment connectors 26 and the element connectors 36.

In addition, the tower section 1 according to the invention is simple and inexpensive to assemble.

According to a variant (not shown) of the embodiment shown in FIGS. 1 to 6, the tower section also comprises reinforcements to allow a better distribution of stresses within the tower section, in particular, on both sides of the joining plane P.

The reinforcements are arranged on the same surface of the tower section 1 as the segment connectors 26, extending astride two adjacent tower elements 14.

Each reinforcement extends in the longitudinal extension of at least one segment connector 26 and opposite, in the radial direction, one element connector 36. The wall segments 16 connected together by the segment connector 26 are thus locally interposed between the element connector 36 extending on one side of the wall and the reinforcement extending on the other side of this wall. Thus, at each reinforcement, there is an overlap, in the radial direction, of the reinforcement, of the wall of the tower element 14 and of the segment connector 26, resulting in a triple wall thickness.

The reinforcement is flat. It is advantageously made by simple cutting from a steel sheet. It has a rectangular shape elongated in a direction perpendicular to the longitudinal direction.

In order to improve stress distribution without compromising the connection of tower elements, the size of the reinforcement is kept strictly smaller than the size of the element connector 36 oriented in the radial direction. In particular, the height of the reinforcement is strictly lower than the height of the element connector 36. In other words, the reinforcement is spaced, in the longitudinal direction, away from the adjacent segment connector 26. Preferably, the distance, in the longitudinal direction, between the reinforcement and each longitudinally adjacent segment connector 26 is greater than or equal to the height of the reinforcement. More preferably, the reinforcement has a height between 10% and 30% of the height of the connector element.

Preferably, the width of the reinforcement is greater than or equal to the width of the adjacent segment connectors 26. It is preferably less than or equal to the width of the facet of the tower section 1 to which the reinforcement is attached, measured at the joining plane P between these two tower elements 14. It is, for example, greater than or equal to 70% of the width of the facet of the tower section 1 to which the reinforcement is attached, measured at the level of the joining plane P between these two tower elements 14, and more particularly at 85% of this width. More particularly, the reinforcements have a width substantially equal to the width of the facet of the tower section 1 to which they are attached.

Preferably, the reinforcements are symmetrical with respect to the joining plane P between the tower elements 14 they overlap.

Preferably, all reinforcements are identical.

By way of example, each reinforcement comprises a regular network of connection ports intended to receive reinforcement connection members from the tower elements 14. The network of connection ports coincides with the network of connection ports 39 of element connectors 36. The connection members of the reinforcement preferably coincide with the secondary connection members which attach element connectors 36 to the tower elements 14. Preferably, each reinforcement comprises, on each side of the joining plane P, a single line of connection ports coinciding with the primary line of connection ports 39 of the corresponding connector element 36.

These reinforcements, although extending astride two tower elements 14, are distinct from element connectors 36. Whereas the latter provide the connection between the tower elements, the reinforcements, due to their small size, are incapable of providing the connection between the elements. By locally forming a local triple thickness on both sides of the junction plane, they contribute only to improving the local distribution of stresses.

Optionally, the tower section 1 also comprises intermediate reinforcements arranged on the same surface of the tower section 1 as the reinforcements, extending astride two adjacent tower elements 14, between the two adjacent reinforcements.

The intermediate reinforcements connect the tower elements 14 together at central panels 18 of their wall segments 16. They extend astride the two adjacent tower elements 14 by being attached to the central panels 18 of the wall segments 16 of these tower elements 14.

The intermediate reinforcements have the same geometry as the reinforcement connectors.

In the case where the tower section 1 comprises intermediate connectors 37, each intermediate reinforcement extends opposite, in the radial direction, to an intermediate connector 37.

The method for assembling the tower sections 1 according to this variant differs from the method described in the Figures only in that the step of assembling the tower elements 14 together also comprises the assembly on the wall segments of the reinforcements, and optionally intermediate reinforcements.

Similar to what has been described above, these reinforcements can be pre-assembled on the corresponding wall segments 16.

A tower section 1 according to a variant of the embodiment shown in the Figures differs from the tower section 1 shown in the Figures only in that the longitudinally adjacent tower elements 14 are offset at an angle from each other so that the longitudinal edges of a wall segment 16 of the upper tower element 14 are not in extension of the longitudinal edges of the longitudinally adjacent wall segment 16 of the lower tower element 14. In other words, the joining lines between circumferentially adjacent wall segments 16 of the upper tower element 14 are angularly offset with respect to the joining lines between circumferentially adjacent wall segments 16 of the lower tower element 14. They do not coincide with each other in the extension in the longitudinal direction.

According to this variant, at least one central panel 18 of a wall segment 16 of the upper tower element 14 faces, in the longitudinal direction, two adjacent side panels 20 of the lower tower element 14.

Thus, the segment connectors 26 of the upper tower element 14 are angularly offset with respect to the segment connectors 26 of the lower tower element 14. They do not coincide with each other.

In this variant, given the angular offset between the adjacent tower elements 14, each element connector 36 extends with respect to a single segment connector 26. In addition, each element connector 36 extends astride three wall segments 16, and not four as in the previous embodiment.

The method for assembling the tower section 1 according to this variant is similar to the one described above, the only difference being that the tower elements 14 are stacked such that there is an angular offset between the adjacent tower elements 14.

The tower section 1 according to this variant has the same advantages as those described above.

In addition, the angular offset of the tower elements 14 improves the tensile strength of the tower section 1 and tower 2 insofar as the joining lines between wall segments 16 of the adjacent tower elements 14, delimited by the segment connectors 26, are not arranged facing each other in the longitudinal direction. Indeed, the mechanically weaker zones are thus better distributed over the circumference of the tower section 1, which further improves the tensile strength of the wind turbine tower 2.

In the embodiment described with reference to the Figures, the segment connectors 26, as well as, optionally, the reinforcements and/or the intermediate reinforcements, are arranged on the inner surface 12 of the tower section 1, whereas the element connectors 36 and the optional intermediate connectors 37 are arranged on the outer surface 13 of the tower section 1. The tower section 1 according to variants differs from this tower section of embodiments in the Figures only in that the segment connectors 26, as well as, optionally, the reinforcements and/or the intermediate reinforcements, are arranged on the outer surface 13 of the tower section 1, whereas the element connectors 36 and the optional intermediate connectors 37, are arranged on the inner surface 12 of the tower section 1.

The tower section 1 according to this variant has the same advantages as those described above with reference to the embodiment in FIGS. 1 to 6.

In addition, according to this variant, the assembly method differs from the method described above only with regard to the sides of the wall segments 16 to which the segment connectors 26, the element connectors 36, and any intermediate connectors 37, reinforcements, and intermediate reinforcements are applied.

What is claimed is:

1. A tower section for a wind turbine, the tower section having a longitudinal central axis extending in a longitudinal direction and defining a wall comprising an inner surface and an outer surface, the tower section comprising:
   at least two tubular tower elements stacked in the longitudinal direction, arranged edge to edge at a joining plane and connected together by element connectors each extending astride the two tower elements;
   each tower element including at least two wall segments connected together by segment connectors extending along longitudinal edges of the wall segments,
   the element connectors being arranged only on one of either the inner surface or the outer surface and the segment connectors being arranged only on the other of either the inner surface or the outer surface,
   no element connector facing at least partially a segment connector in a radial direction of the tower section so that the wall is at no point interposed between the element connector and the segment connector,
   wherein the element connectors are arranged on the outer surface and the segment connectors are arranged on the inner surface.

2. The tower section as recited in claim 1 wherein each element connector extends between two segment connectors aligned in the longitudinal direction, one of the two segment connectors being defined as an upper segment connector and arranged above the joining plane and the other of the two segment connectors being defined as a lower segment connector and arranged below the joining plane.

3. The tower section as recited in claim 2 wherein a distance between an upper transverse edge of one element connector of the element connectors and a lower transverse edge of the upper segment connector is greater than or equal to zero and a distance between a lower transverse edge of the one element connector and an upper transverse edge of the lower segment connector is greater than or equal to zero.

4. The tower section as recited in claim 2 wherein an upper transverse edge of one element connector of the element connectors and a lower transverse edge of the upper segment connector are located in a same plane perpendicular to the longitudinal direction and wherein a lower transverse edge of the one element connector and an upper transverse edge of the lower segment connector are located in a same further plane perpendicular to the longitudinal direction.

5. The tower section as recited in claim 1 wherein each segment connector or each element connector is in the form of a flat plate.

6. The tower section as recited in claim 1 wherein each wall segment includes at least one central panel and two side panels forming an angle with the or each central panel, the side panels defining the longitudinal edges of the wall segment.

7. The tower section as recited in claim 6 further comprising intermediate connectors extending astride two adjacent tower elements of the at least two tubular tower elements, the intermediate connectors being between two circumferentially adjacent element connectors, the intermediate connectors being arranged on the one of either the inner surface or the outer surface.

8. The tower section as recited in claim 1 wherein the longitudinal edges of a wall segment of an upper tower element of the two tower elements are located in an extension of the longitudinal edges of the adjacent wall segment in the longitudinal direction of a lower tower element of the two tower elements.

9. The tower section as recited in claim 1 wherein adjacent tower elements are angularly offset from each other.

10. The tower section as recited in claim 1 wherein the tower section has a tubular shape having a polygonal cross-section, each side of the tubular shape having the polygonal cross-section defining a facet of the tower section.

11. The tower section as recited in claim 1, wherein each tower element comprises a single segment connector at each junction between two circumferentially adjacent wall segments.

12. The tower section as recited in claim 1, wherein the element connectors have a width greater than or equal to 70% of a width of a facet of the tower section to which they are attached.

13. The tower section as recited in claim 12, wherein the width is greater than or equal to 85% of the width of the facet of the tower section to which they are attached.

14. The tower section as recited in claim 1, wherein thickness of the at least two wall segments of the at least two tubular tower elements decreases from base to apex of the tower section.

15. The tower section as recited in claim 1, further comprising at least one intermediate connector extending astride over the joining plane and not extending over any of the longitudinal edges of the wall segments.

16. A wind turbine tower comprising at least one tower section as recited in claim 1.

17. A method for assembling a tower section as recited in claim 1, the method comprising:
   providing the wall segments and assembling of the wall segments together by the segment connectors so as to form the at least two tower elements; and
   stacking, in the longitudinal direction, the at least two tower elements and connecting together of the at least two tower elements by the element connectors.

* * * * *